Patented Mar. 14, 1933

1,901,145

UNITED STATES PATENT OFFICE

PETER C. CHRISTENSEN, OF EAST ORANGE, NEW JERSEY

COMPOSITION AND THE PRODUCTION THEREOF

No Drawing. Refiled for abandoned application Serial No. 155,560, filed December 17, 1926. This application filed July 12, 1932. Serial No. 622,109.

This application is directed to the same subject matter as my application Serial No. 155,560, filed December 17, 1926, and entitled Compositions and the production thereof, which application Serial No. 155,560 was allowed March 10, 1930 but has become abandoned.

My invention relates to a new composition which is especially adapted for use in certain forms thereof as coating materials in the nature of varnishes, liquid shellacs, lacquers, sizings and oil paints, and as liquid filling and impregnating materials, and which may also advantageously be used as a thermoplastic molding material or as the main ingredient or base of the latter. My invention also relates to the methods for preparing the composition and the coating and other materials for which the same is designed to be used.

The principal object of my invention is to provide a composition of this character which when produced in the various forms suitable for use in place of varnishes, shellacs, lacquers and the other materials mentioned above, is not only generally cheaper than those forms of these materials now commonly employed, but in most cases, as to certain characteristics thereof, is also superior to such materials.

Further objects and features of my invention will be hereinafter more fully described and claimed.

The basis of my invention is the thorough and intimate commingling, preferably by bringing them together in solution, of certain leather constituents, and particularly the protein constituents, and ordinary shellac in various proportions, preferably varying from about 25% to 75% by weight of the leather constituents and the equivalent of from about 75% to 25% by weight of shellac when in the dry powdered or flake form, largely depending on the particular use to which the ultimate product is to be put.

The protein leather constituents used in preparing my new composition are preferably obtained in the form of a gum, which may aptly be termed "leather gum", as follows:

Leather, and preferably scrap leather, because of its cheapness, is first subjected, preferably at room temperature, to a solution of a suitable material which will act to remove from the leather the oils, fats, glucose, glycerine and similar substances. A solution of any of a number of materials, and notably of sulphuric, nitric or hydrochloric acid, may be used to advantage, but in general I find that best results are obtained, especially where the ultimate product is to be used as oil paint, liquid shellac, varnish or lacquer, by subjecting the leather to a solution of hydrochloric acid. While good results are derived by using anywhere from a fraction of one per cent up to a ten per cent acid solution, it is noted that as a general rule the weaker the solution employed the better the results obtained, and I preferably employ from about a one-half of one per cent to a two per cent solution of hydrochloric acid. The leather is subjected to the action of the acid solution for a period of from about six to twenty-four hours, depending mainly on the strength of the solution employed and the thickness of the leather pieces being treated. The leather is then removed from the solution and boiled in water in an open vessel for a period varying from about one-half an hour to three hours, until the leather, then consisting almost entirely of protein fibrous materials, becomes disintegrated and comminuted and settles in the form of heavy brown gum. This gum which is the "leather gum" referred to above, is ten preferably dried and ground to a fine granular form.

In the production of my new composition, as heretofore indicated, the desired proportions of the protein constituents of leather, preferably "leather gum" produced as just described, and ordinary shellac are thoroughly and intimately commingled in a suitable solvent in which both of these materials will dissolve and be maintained in solution.

The solvent of the composition in which the "leather gum" and shellac are combined and maintained in solution, is subject to some variation, but preferably comprises a mixture of a weak alkaline water solution, alcohol, and Pyranton, i. e. diacetone alcohol. It is preferred to use Pyranton in the solvent as the "leather gum" is more readily dissolved when Pyranton is used. While it is also preferable to employ alcohol in the solvent, good results are obtained when this ingredient is omitted. The "leather gum" and shellac may both be dissolved at the same time in the solvent consisting of a mixture such as described. I prefer, however, to dissolve the shellac in a suitable weak alkaline water solution, preferably a solution of ammonium hydroxide, although other alkaline water solutions such as those of borax, potash, soda and sodium phosphate may be used, and to dissolve the "leather gum" in a mixture of either alcohol or water, and Pyranton, but preferably in a mixture of alcohol and Pyranton, and to then combine and thoroughly mix together the resulting solutions of shellac and "leather gum".

For most purposes for which my composition is designed, I find that the best or at least very good results are obtained by embodying therein substantially equal proportions of the "leather gum" and shellac, and it is this form of the composition and the preferred method of producing the same which I shall proceed to specifically describe. Ordinary dry powdered or flake shellac is dissolved in a water solution of ammonium hydroxide substantially in the proportions of 100 parts by weight of shellac, and 775 parts by weight of the solution containing 75 parts by weight of ammonium hydroxide. The strength of this alkaline solution is, however, subject to great variation. The solution is preferably heated to a tepid or luke-warm condition as this materially increases the speed at which the shellac dissolves therein. An amount of "leather gum" substantially equal to that of the shellac dissolved in the alkaline solution, is separately dissolved in a mixture of alcohol and Pyranton substantially in the proportions of 100 parts by weight of "leather gum", 150 parts by weight of alcohol and 25 parts by weight of Pyranton. It is also to be understood that these proportions may be greatly varied. This mixture is preferably heated to a temperature of 150° F. to 200° F. as the speed at which the "leather gum" dissolves therein is thereby considerably increased. The solutions of shellac and "leather gum" obtained as just described, are now combined and thoroughly mixed at ordinary room temperature. The result is a thick heavy brownish liquid, which product constitutes my new and improved composition in the form of a base or "stock" for coating, filling, impregnating and molding materials of the nature indicated above.

To reduce the composition produced, as described above, in the form of a base or "stock" material, to the desired consistency for use as a coating, impregnating or filling material, it is merely necessary to add thereto the proper amount of a suitable thinning solvent such, for example, as a water solution of ammonia.

To prevent the throwing down of the "leather gum" and consequently the coagulation or jellying of the composition, I preferably mix therewith a small amount of urea, preferably about one part by weight of urea to 50 parts by weight of the composition when the latter is in the form of the thick heavy solution described, that is, in the form of the base or "stock" material. The addition of the urea, which readily goes into solution, is particularly advantageous where the composition is to be used as a coating material, for it increases the flexibility thereof to a marked degree and renders a coating produced by the use thereof, upon drying, much less liable to cracking and chipping or flaking. It is also advantageous to add to the heavy thick base or "stock" described above, a small amount of any of the group of aldehydes consisting of aldol, acetic aldehyde and paraldehyde, regardless of whether such base or "stock" is to be used for a coating, filling, impregnating or a molding material, for any of these aldehydes when embodied in my improved composition not only materially increases the moisutre repellent or waterproofing qualities thereof, but also acts to increase the solubility of both the "leather gum" and the shellac in the solvent and therefore to prevent said materials from being thrown down in the solvent. Either the urea or one of the group of the aldehydes mentioned may alone be added to the composition with good results, but I perfer to add both the urea and one of such aldehydes.

In forming a molding material from my improved composition, the proper amount of a suitable filling material such, for example, as wood flour, rotten stone, powdered chalk, flock, asbestos, etc., is thoroughly mixed, preferably in a mixing machine, with the thick heavy base or "stock" composition, with which has preferably, though not necessarily, already been incorporated either the urea, or one of the aldehydes mentioned above, or both of these substances. The mixture thus produced is dried until hard and is then ground or pulverized into a powdered or granular form. This pulverized mixture constitutes an excellent molding powder which may be readily formed under heat and pressure into a great variety of shapes. The amount of filling material mixed with the base or "stock" composition may vary greatly. I have found that anywhere from 25 parts to 700 parts by weight of the filling material may be combined with 100 parts by weight of the base or "stock" composition. The proper proportion of filling material to employ is dependent on the rigidity and strength required of the molded articles to be formed from the powder; and in this connection it may be stated generally, that the smaller the amount of filling material used in forming the molding powder, the stronger will be the articles molded from the powder.

In addition to being very economical to produce, my improved composition has many other advantages. When embodied in forms suitable for use as coating materials in the nature of liquid shellac, varnish, lacquer and oil paint, this composition is not only capable of covering more surface than the materials just mentioned, but also is very quick drying—in fact it dries as quickly if not more quickly than ordinary liquid shellac. Moreover, a coating produced by its use is hard, tough, durable and glossy. In case, however, a dull coating is desired, this can readily be provided for by mixing with the composition the proper amount of a suitable flattener such as aluminum oleate, aluminum palmitate, aluminum stearate, or any of a number of resinates. Because of the qualities mentioned, and also because it is moisture repellant and has good heat resistant qualities, the composition as a coating material is admirably adapted for outside use. My composition is also especially well adapted for molding purposes, as articles formed from the molding powder described, in addition to being tough, strong and water repellent, have extraordinary fire-resistant and electrical insulating properties.

It is to be understood that the improved composition and also the method of producing the same, as specifically described herein, are subject to many variations and modifications without departing from the spirit of my invention or the scope of the appended claims.

Having now described my invention, what I claim as new and desire to protect by Letters Patent; is as follows:

1. A composition of the character described, comprising an alkaline solution having Pyranton mixed therewith, said solution having leather constituents and shellac dissolved therein.

2. A composition of the character described, comprising a solution having shellac and only the protein constituents of leather dissolved therein.

3. A composition of the character described, comprising a liquid consisting of a mixture of an alkaline solution and alcohol containing Pyranton, said liquid having "leather gum" and shellac dissolved therein.

4. A composition of the character described, comprising a solution of ammonium hydroxide having Pyranton mixed therewith, said solution having "leather gum" and shellac dissolved therein.

5. A composition of the character described, comprising a solution having "leather gum" and shellac dissolved therein, and containing urea.

6. A composition of the character described, comprising an alkaline solution having one of the group of aldehydes consisting of aldol, acetic aldehyde and paraldehyde mixed therewith and having shellac and only the protein constituents of leather dissolved therein.

7. A composition of the character described, comprising an alkaline solution having one of the group of aldehydes consisting of aldol, acetic aldehyde and paraldehyde mixed therewith and having "leather gum", shellac and urea dissolved therein.

8. A composition of the character described comprising an intimate mixture of materials including shellac, one of the groups of aldehydes consisting of aldol, acetic aldehyde and paraldehyde, and only the protein constituents of leather.

9. A composition of the character described comprising an intimate mixture of materials including "leather gum", shellac, one of the group of aldehydes consisting of aldol, acetic aldehyde and paraldehyde, and urea.

10. The method which consists in dissolving protein constituents of leather in a solution containing Pyranton, dissolving shellac in an alkaline solution, and then mixing together the two solutions.

11. The method which consists in dissolving protein constituents of leather in a solution containing Pyranton while subjecting such solution to heat, dissolving shellac in an alkaline solution while maintaining the latter in heated condition, and then mixing together the two solutions.

12. The method which consists in dissolving protein constituents of leather in alcohol having Pyranton mixed therewith, dissolving shellac in an alkaline water solution, and then mixing together the two solutions.

13. The method which consists in thoroughly commingling shellac and only the protein constituents of leather in an alkaline solution and drying and pulverizing the resulting product.

14. The method which consists in commingling protein constituents of leather and shellac in solution, and adding urea to the solution.

15. The method which consists in commingling shellac and only the protein constituents of leather in solution and mixing with the solution an aldehyde of the group consisting of aldol, acetic aldehyde and paraldehyde.

16. The method which consists in commingling protein constituents of leather and shellac in solution and mixing with the solution urea and an aldehyde of the group consisting of aldol, acetic aldehyde and paraldehyde.

This specification signed this 1st day of July 1932.

PETER C. CHRISTENSEN.